United States Patent

Robirds et al.

[11] Patent Number: 5,594,610
[45] Date of Patent: Jan. 14, 1997

[54] PIVOT-DISCONNECTING CIRCUIT BREAKER

[75] Inventors: Timothy G. Robirds; Mark L. Allen; Ralph E. Baker, all of Sumter, S.C.

[73] Assignee: Eaton Corporation, Cleveland, Ohio

[21] Appl. No.: 403,330

[22] Filed: Mar. 14, 1995

[51] Int. Cl.⁶ ........................................... H02H 5/04
[52] U.S. Cl. ............................ 361/104; 361/115; 361/93
[58] Field of Search ................................. 361/104, 103, 361/115, 93, 39; 337/175

[56] References Cited

U.S. PATENT DOCUMENTS

| | | | |
|---|---|---|---|
| 3,801,946 | 4/1974 | Blewitt | 337/175 |
| 4,240,053 | 12/1980 | Nelson et al. | 335/16 |
| 4,351,013 | 9/1982 | Matsko et al. | 361/96 |
| 4,565,908 | 1/1986 | Bould | 200/50 AA |

OTHER PUBLICATIONS

*Westinghouse Type HLE Current Limiting Fuses*, pp. 1–4, Jun. 1994, Cutler–Hammer Descriptive Bulletin 36–700.
*Instructions for Installation, Operation, and Maintenance of Type VCP–W Vacuum Circuit Breakers*, pp. 1–66, Mar. 1993, Westinghouse Electric Corporation I.B. 32–255–1C.

Primary Examiner—Jeffrey A. Gaffin
Assistant Examiner—Stephen W. Jackson
Attorney, Agent, or Firm—Martin J. Moran

[57] ABSTRACT

A circuit interruption apparatus for a power circuit having a power source and a load includes a termination mechanism for interconnection with the power source and the load; a circuit interrupter having a line terminal and a load terminal for interrupting the power circuit between the power source and the load; and a pivot mechanism for pivoting the circuit interrupter between a first position wherein the line terminal and the load terminal are interconnected with the termination mechanism, and a second position wherein one of the line terminal and the load terminal is disconnected from the termination mechanism. Alternatively, a circuit interruption apparatus for the power circuit may include a line termination mechanism for interconnection with the power source; a circuit interrupter having a line terminal and a load termination mechanism for interconnection with the load; and a pivot mechanism for pivoting the circuit interrupter between the first position and the second position. Alternatively, a circuit interruption apparatus for a power circuit may include a circuit interrupter having a trip lever mechanism for tripping open the power circuit and for interrupting the power circuit between the power source and the load; and a fuse in series with the circuit interrupter between the power source and the load for interrupting the power circuit therebetween and having a striker pin for engaging the trip lever mechanism and tripping open the power circuit whenever the fuse interrupts the power circuit.

11 Claims, 4 Drawing Sheets

FIG.2
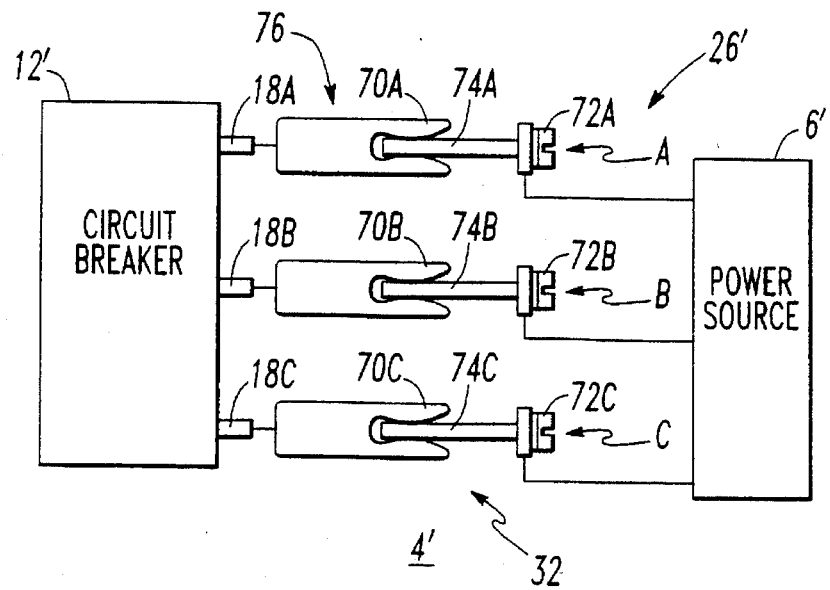
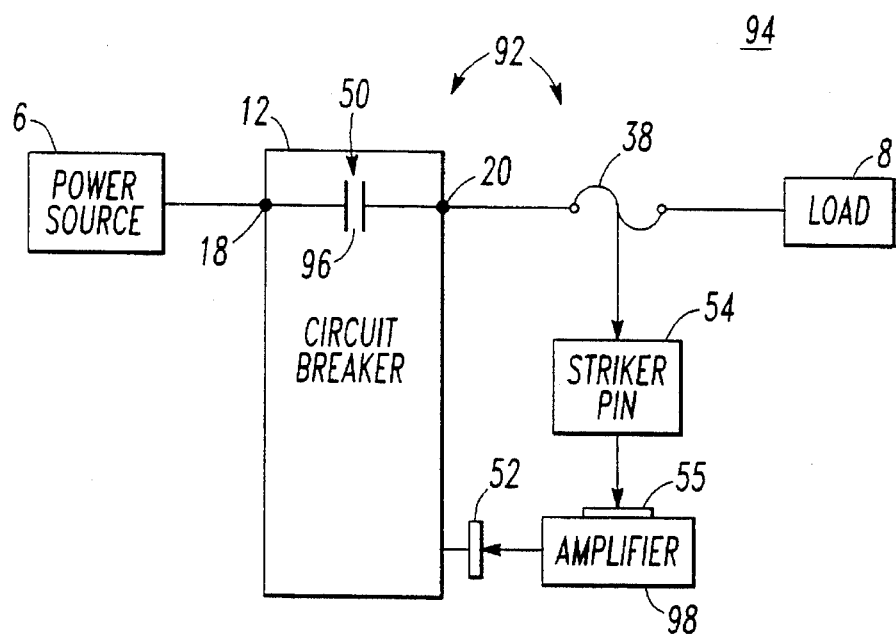
FIG.3

PIVOT-DISCONNECTING CIRCUIT BREAKER

BACKGROUND OF THE INVENTION

1. Field of the Invention

This invention is directed to a circuit switching device, and more particularly to such a device including a circuit breaker mounted to a pivot arm for physically disconnecting the circuit breaker from a power source and a load. The invention is also directed to a circuit switching device including a circuit breaker and a fuse having a striker pin for tripping the circuit breaker.

2. Background of Information

Circuit breakers are generally used to protect electrical circuitry from damage due to an overcurrent condition, such as an overload fault or a relatively high level short circuit condition. An overload fault condition is normally about 125–600 percent of the nominal current rating of the circuit breaker. A high level short circuit condition can be 1000 percent or more of the nominal current rating. For example, in a bolted three phase line-ground fault, the short circuit current may exceed 100 KA at 480 VAC. Circuit breakers also provide a power circuit electrical disconnection function. In the event of other power circuit problems or during maintenance, for example, the circuit breaker may be used to electrically disconnect a power source from a load.

Drawout circuit breakers are well known in the art. A typical example may be found in U.S. Pat. No. 4,565,908 issued Jan. 21, 1986. Such circuit breakers include a drawout mechanism which permits an operator to physically disconnect the circuit breaker from a power source and a load which are electrically interconnected with the circuit breaker by terminals at the rear of the circuit breaker. The drawout mechanism generally provides an indirect indication (e.g., via a mechanical indicator) that the circuit breaker is at least partially withdrawn from its enclosure and, hence, is physically disconnected from the power source and the load. The mechanical complexity of the drawout circuit breaker leaves room for improvement in terms of cost and application of the physical disconnection function to conventional non-drawout circuit breakers.

It is also known to use a mechanical interlock with the drawout circuit breaker in order to trip such circuit breaker, whenever the power source is electrically interconnected with the load, before the circuit breaker is withdrawn from its enclosure. In this manner, the separable contacts of the circuit breaker, and not the rear terminals, electrically disconnect the load from the power source.

It is further known to use a fuse in combination with a circuit breaker to provide a variety of circuit interrupting characteristics. For example, the circuit breaker may provide a long time delay characteristic having an $I^2t$ function. The fuse may be connected in series with the circuit breaker and have an $I^4t$ function.

There remains a need, therefore, for a non-drawout circuit breaker which provides a physical disconnection function.

There is a more particular need for such a circuit breaker which reduces mechanical complexity in comparison to a drawout circuit breaker.

There is another more particular need for such a circuit breaker which reduces cost in comparison to a drawout circuit breaker.

There is yet another more particular need for such a circuit breaker which coordinates the use of a fuse in combination with the physical disconnection function.

There is still another more particular need for such a circuit breaker which reduces the relative size of the housing for such circuit breaker and related switching equipment.

SUMMARY OF THE INVENTION

These and other needs are satisfied by the invention which is directed to a circuit interruption apparatus for a power circuit having a power source and a load. The apparatus includes a termination mechanism for interconnection with the power source and the load; a circuit interrupter having a line terminal and a load terminal for interrupting the power circuit between the power source and the load; and a pivot mechanism for pivoting the circuit interrupter between a first position wherein the line terminal and the load terminal are interconnected with the termination mechanism, and a second position wherein one of the line terminal and the load terminal is disconnected from the termination mechanism. The termination mechanism may include a line termination mechanism for interconnection with the power source. The circuit interrupter may include a connection mechanism for connecting the line terminal to the line termination mechanism. The pivot mechanism may pivot the circuit interrupter and the connection mechanism between a connected position where the line terminal is interconnected with the line termination mechanism and a disconnected position where the line terminal is disconnected from the line termination mechanism. The termination mechanism may further include a load termination mechanism for interconnection with the load. The load termination mechanism may include a fuse and a fuse holder for holding the fuse. The fuse may be in series with the load terminal and the load for interrupting the power circuit between the power source and the load.

The circuit interrupter may include a circuit between the line terminal and the load terminal and a trip lever for tripping open the circuit between the line terminal and the load terminal. The fuse may include a striker pin for engaging the trip lever and opening the circuit whenever the fuse interrupts the power circuit between the power source and the load. The striker pin may provide a striking force whenever the fuse interrupts the power circuit. The trip lever may have a minimum engaging force for opening the circuit which is larger than the striking force. The fuse may also include a force amplification mechanism for amplifying the striking force and providing to the trip lever an engaging force which at least equals the minimum engaging force.

The pivot mechanism may include a current transformer for sensing the current which flows in the power circuit between the power source and the load. The circuit interrupter may include a trip unit for receiving the sensed current from the current transformer and tripping open the circuit between the line terminal and the load terminal under predetermined conditions of the sensed current. The pivot mechanism may also include a pivot point and a pivot arm which is pivotally mounted at the pivot point. The current transformer and the load termination mechanism may both be mounted to the pivot arm. The current transformer may have a hole and the load termination mechanism may include a load cable mechanism for conducting the current through the hole of the current transformer.

The connection mechanism may include a plurality of fingers interconnected with the line terminal. The line termination mechanism may include a stab. The plurality of fingers may grasp the stab in the connected position and release the stab in the disconnected position. The circuit interrupter may have a proximate side and a distal side. The plurality of fingers may be mounted adjacent the distal side of the circuit interrupter. The pivot mechanism may include a housing for housing the circuit interrupter. The housing may include a viewing mechanism for viewing the plurality of fingers and the stab from the proximate side. The housing may have a window and the viewing mechanism may be a mirror for viewing the plurality of fingers and the stab through the window.

The pivot mechanism may include a handle mechanism for moving the circuit interrupter between the connected position and the disconnected position. The circuit interrupter may also include a circuit between the line terminal and the load terminal. The pivot mechanism may include a handle interlock mechanism for locking the circuit interrupter in the connected position whenever the circuit between the line terminal and the load terminal is closed. The circuit interrupter may further include a status indication mechanism for indicating an open status when the circuit is open. The handle interlock mechanism may include a status communication mechanism for communicating the open status to the handle interlock mechanism in order to unlock the circuit interrupter from the connected position.

Alternatively, a circuit interruption apparatus for the power circuit includes a line termination mechanism for interconnection with the power source; a circuit interrupter having a line terminal and a load termination mechanism for interconnection with the load, the circuit interrupter for interrupting the power circuit between the power source and the load; and a pivot mechanism for pivoting the circuit interrupter between a first position wherein the line terminal is interconnected with the line termination mechanism, and a second position wherein the line terminal is disconnected from the line termination mechanism. The load termination mechanism may include a fuse and a fuse holder for holding the fuse. The fuse may be in series with the load terminal and the load for interrupting the power circuit between the power source and the load.

The circuit interrupter may include a circuit between the line terminal and the load terminal and a trip lever for tripping open the circuit. The fuse may include a striker pin for engaging the trip lever and opening the circuit whenever the fuse interrupts the power circuit between the power source and the load. The striker pin may provide a striking force whenever the fuse interrupts the power circuit between the power source and the load. The trip lever may have an engaging force for opening the circuit. The engaging force may be larger than the striking force. The fuse may also include force a amplification mechanism for amplifying the striking force and providing the engaging force to the trip lever.

The force amplification mechanism may include a lever pivotally mounted to a pivot point. The lever may have a first arm which is movable by the striker pin and a second arm which moves the trip lever. The first arm may be longer than the second arm in order to amplify the striking force of the striker pin and provide the engaging force to the trip lever. Alternatively, the force amplification mechanism includes a spring mechanism for driving the trip lever with the engaging force and a holding mechanism for holding the spring mechanism whenever the fuse interconnects the power circuit between the power source and the load. The holding mechanism may be movable by the striking force of the striker pin from a hold position to a release position whenever the fuse interrupts the power circuit between the power source and the load.

Alternatively, a circuit interruption apparatus for the power circuit includes a circuit interrupter for interrupting the power circuit between the power source and the load, the circuit interrupter having a trip lever mechanism for tripping open the power circuit; and a fuse in series with the circuit interrupter between the power source and the load for interrupting the power circuit therebetween, the fuse having a striker pin for engaging the trip lever mechanism and tripping open the power circuit whenever the fuse interrupts the power circuit. The striker pin may provide a striking force whenever the fuse interrupts the power circuit between the power source and the load. The trip lever mechanism may have a minimum engaging force for tripping open the power circuit. The minimum engaging force may be larger than the striking force. The fuse may also include a force amplification mechanism for amplifying the striking force and providing to the trip lever mechanism an engaging force which at least equals the minimum engaging force.

BRIEF DESCRIPTION OF THE DRAWINGS

A full understanding of the invention can be gained from the following description of the preferred embodiments when read in conjunction with the accompanying drawings in which:

FIG. 2 is a plan view in partial block diagram form of a three-phase circuit breaker with each phase including fingers and a stab for interconnection with a three-phase power source in accordance with the present invention;

FIG. 3 is a block diagram of a circuit interruption device including a circuit breaker and a fuse having a striker pin for tripping the circuit breaker in accordance with the present invention;

DESCRIPTION OF THE PREFERRED EMBODIMENT

Figure 1:
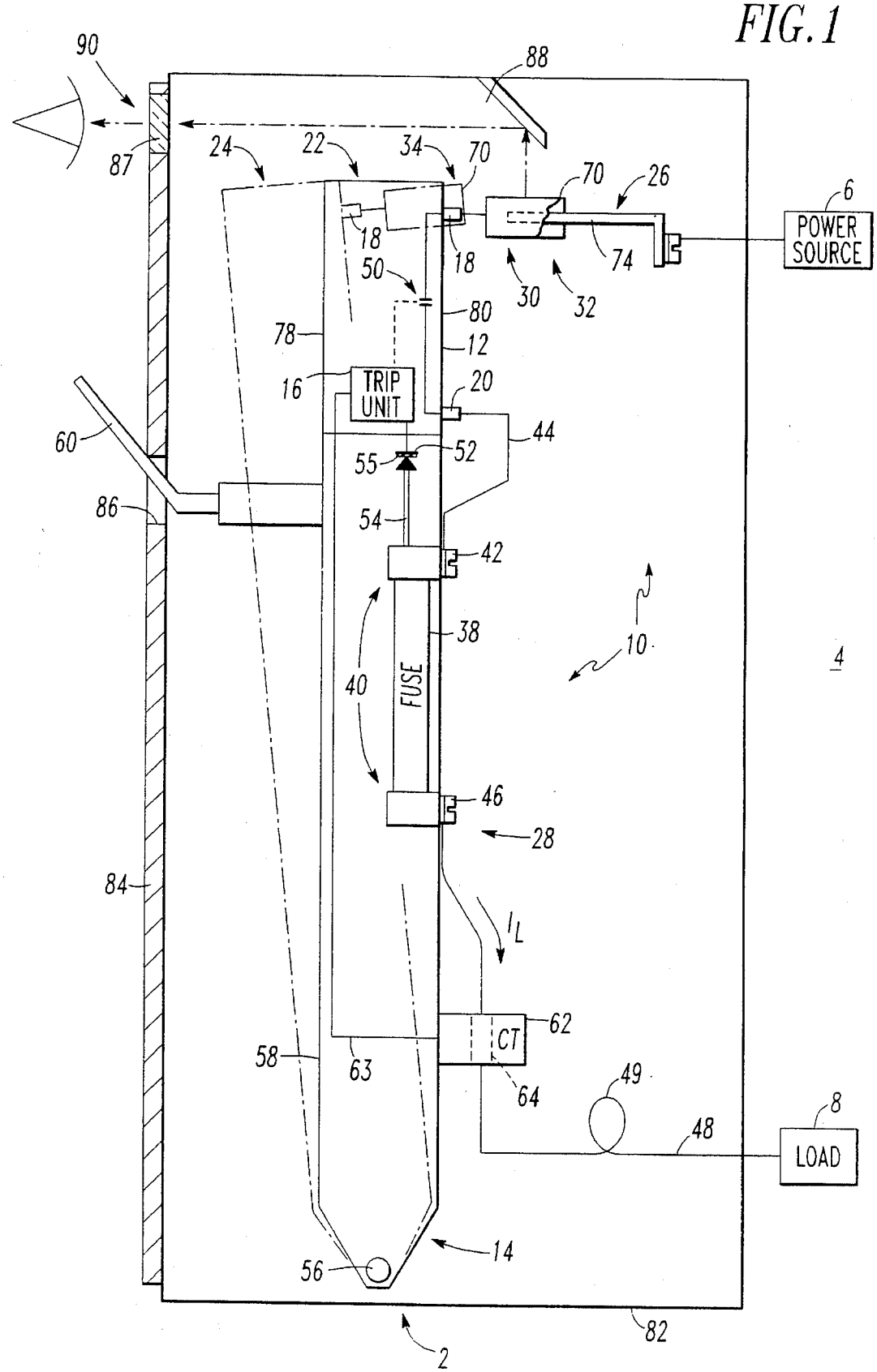
FIG. 1 is a vertical sectional view with some parts cut away and in partial block diagram form of a circuit interruption device including a pivot arm for mounting a circuit breaker, a fuse and a current transformer in accordance with the present invention.

FIG. 1 illustrates a circuit interruption apparatus 2 for a power circuit 4 having a power source 6 and a load 8. The apparatus 2 includes a termination mechanism 10 for interconnection with the power source 6 and the load 8, a circuit breaker 12, and a pivot mechanism 14 for pivoting the circuit breaker 12. A typical example of a circuit breaker may be found in U.S. Pat. No. 4,240,053 issued Dec. 16, 1980, which is herein incorporated by reference. The exemplary circuit breaker 12 includes a trip unit 16 for interrupting (e.g., under overcurrent conditions) the power circuit 4 between the power source 6 and the load 8. A typical example of a trip unit for a circuit breaker may be found in U.S. Pat. No. 4,351,013 issued Sep. 21, 1982, which is herein incorporated by reference, although the present invention is applicable to other types of circuit interrupters not having a trip unit (e.g., a circuit switching device, a molded case switch, etc.).

The circuit breaker 12 also includes a line terminal 18 and a load terminal 20. The pivot mechanism 14 pivots the circuit breaker 12 between a first position 22, where the line terminal 18 and the load terminal 20 are interconnected with the termination mechanism 10, and a second position 24 (shown in phantom line), where the line terminal 18 is preferably disconnected from the termination mechanism 10 for safety considerations. Those skilled in the art will appreciate that other equivalent termination mechanisms are possible (e.g., where the load terminal 20 is disconnected from the termination mechanism 10).

The termination mechanism 10 includes a line termination mechanism 26 for interconnection with the power source 6 and a load termination mechanism 28 for interconnection with the load 8. The circuit breaker 12 also includes a connection mechanism 30 for connecting the line terminal 18 to the line termination mechanism 26. The pivot mechanism 14 pivots the circuit breaker 12 and the connection mechanism 30 between a connected position 32 where the line terminal 18 is interconnected with the line termination mechanism 26 and a disconnected position 34 (shown in phantom line) where the line terminal 18 is preferably disconnected from the line termination mechanism 26.

The exemplary load termination mechanism 28 includes a fuse 38 and fuse holder 40 for holding the fuse 38. The fuse holder 40 has a terminal 42 which is connected to the load terminal 20 by a jumper 44, such as a cable or bus bar. The use holder 40 also has a terminal 46 which is connected to the load 8 by a load cable 48. In this manner, the fuse 38 is in series with the load terminal 20 and the load 8 in order to interrupt the power circuit 4 between the power source 6 and the load 8. Preferably, the load cable 48 has a service loop 49 which accommodates movement of the terminal 46 by the pivot mechanism 14.

The exemplary circuit breaker 12 includes a circuit 50, which is between the line terminal 18 and the load terminal 20, and an external trip lever 52 (e.g., a trip floor tripper roller) for tripping open the circuit 50. An example of a circuit breaker having an external trip lever is a Type VCP-WR Red Line Series of Fixed Vacuum Breakers marketed by Cutler-Hammer. Whenever the trip lever 52 is pushed up with respect to FIG. 1, a trip shaft (not shown) or spring release latch (not shown) rotates and the circuit breaker 12, in turn, opens the circuit 50 between the line terminal 18 and the load terminal 20, although the present invention is applicable to any type of circuit interrupter having an external lever or equivalent switching mechanism for opening the circuit 50.

The exemplary fuse 38 includes a striker pin 54 which is normally held within the fuse 38 and is ejected from the fuse 38 (as shown in FIG. 1) whenever the fuse 38 interrupts the power circuit 4. An example of a fuse having a striker pin is a Type HLE Current Limiting Fuse marketed by Cutler-Hammer. The exemplary striker pin 54 delivers about 3 joules of energy over a 0.625 inch travel distance, although any fuse having a striker pin or equivalent blown fuse indicator mechanism may be used. Whenever the fuse 38 interrupts the power circuit 4, the striker pin 54 engages the trip lever 52 (which moves upward with respect to FIG. 1) and the circuit breaker 12 opens the circuit 50 between the line terminal 18 and the load terminal 20. In this manner, the voltage of the power source 6 is removed from the load terminal 20 and, hence, the series-connected fuse holder 40. Preferably, insulation 55 separates the striker pin 54 from the trip lever 52.

The exemplary pivot mechanism 14 includes a pivot point 56 and a pivot arm 58. The pivot arm 58 is pivotally mounted at one end to the pivot point 56. The circuit breaker 12 is mounted at the other end of the pivot arm 58. The exemplary pivot arm 58 includes a handle 60 for moving the arm 58, the fuse holder 40, and a current transformer (CT) 62. The handle 60 moves the circuit breaker 12 between the connected position 32 and the disconnected position 34 (shown in phantom line). The load cable 48 is interconnected from the terminal 46 through a hole 64 (shown in shadow) of the CT 62 to the load 8. The CT 62 senses a load current ($I_L$) which flows in the power circuit 4 between the power source 6 and the load 8. The exemplary trip unit 16 includes an overcurrent sensing device (not shown), such as an overcurrent relay, which receives the sensed current from the CT 62 by a cable 63. The overcurrent sensing device, in conjunction with a direct trip actuator (not shown) of the trip unit 16, trips open the circuit 50 under predetermined conditions of the sensed current.

FIG. 2 is a plan view in partial block diagram form of a three-phase power source 6' and a three-phase circuit breaker 12' for a power circuit 4' having three phases A,B,C, although the invention is applicable to power circuits having any number of phases. The circuit breaker 12' includes three line terminals 18A,18B,18C which are electrically interconnected with three sets of fingers 70A,70B,70C, respectively. A line termination mechanism 26' includes three terminals 72A,72B,72C which are interconnected with the three-phase power source 6'. The terminals 72A,72B,72C have stabs 74A,74B,74C which mate with the fingers 70A,70B,70C, respectively, and, thus, interconnect the line terminals 18A,18B,18C with the three-phase power source 6'. The line terminals 18A,18B,18C and the fingers 70A,70B,70C form a connection mechanism 76. As shown in FIGS. 1 and 2, the fingers 70,70A,70B,70C grasp the corresponding stab 74,74A,74B,74C in the connected position 32. As shown in FIG. 1, the fingers 70 release the stab 74 in the disconnected position 34 (shown in phantom line).

Continuing to refer to FIG. 1, the circuit breaker 12 has a front side 78 and a rear side 80. The fingers 70 are mounted to the line terminal 18 adjacent the rear side 80. The exemplary pivot mechanism 14 further includes a housing 82 for housing the circuit breaker 12 therein. The exemplary housing 82 includes a front door 84 having an opening 86 for the handle 60. The housing 82 also has a window 87. Disposed at the top of the housing 82 above the fingers 70 and the stab 74 is a mirror 88. The mirror 88 and the window 87 form a viewing mechanism 90 for viewing the fingers 70 and the stab 74 from the front side 78 of the circuit breaker 12. In this manner, an operator may easily and accurately determine whether the power circuit 4 is deenergized by directly observing the interconnection of the fingers 70 and the stab 74. The operation of the pivot mechanism 14 eliminates the need for a separate disconnect switch for the power circuit 4 and, hence, reduces the size requirements of the housing 82.

FIG. 3 is a block diagram of another circuit interruption apparatus 92 for another power circuit 94. The apparatus 92 includes the circuit breaker 12 and the fuse 38. The circuit breaker 12 includes the line terminal 18, the load terminal 20, and a pair of separable contacts 96 which control the circuit 50. The separable contacts 96 and the fuse 38 are connected in series between the power source 6 and the load 8. The exemplary fuse 38 includes the striker pin 54. As similarly discussed above with FIG. 1, the striker pin 54 is normally held within the fuse 38 and is ejected from the fuse 38, in order to provide a striking force, whenever the fuse 38 interrupts the power circuit 94. Then, the striker pin 54 applies the striking force to a force amplifier 98 which, in turn, amplifies the striking force and provides to the trip lever 52 an engaging force. The trip lever 52 responds to a minimum engaging force and trips opens the separable contacts 96. The exemplary minimum engaging force is larger than the exemplary striking force. The force amplifier 98 provides the engaging force which at least equals, and preferably exceeds, the minimum engaging force. Then, as similarly discussed above with FIG. 1, the circuit breaker 12 opens the separable contacts 96 and, thus, interrupts the power circuit 94. In this manner, the voltage of the power source 6 is removed from the fuse 38 whenever the fuse 38 interrupts the power circuit 94.

Figure 4:
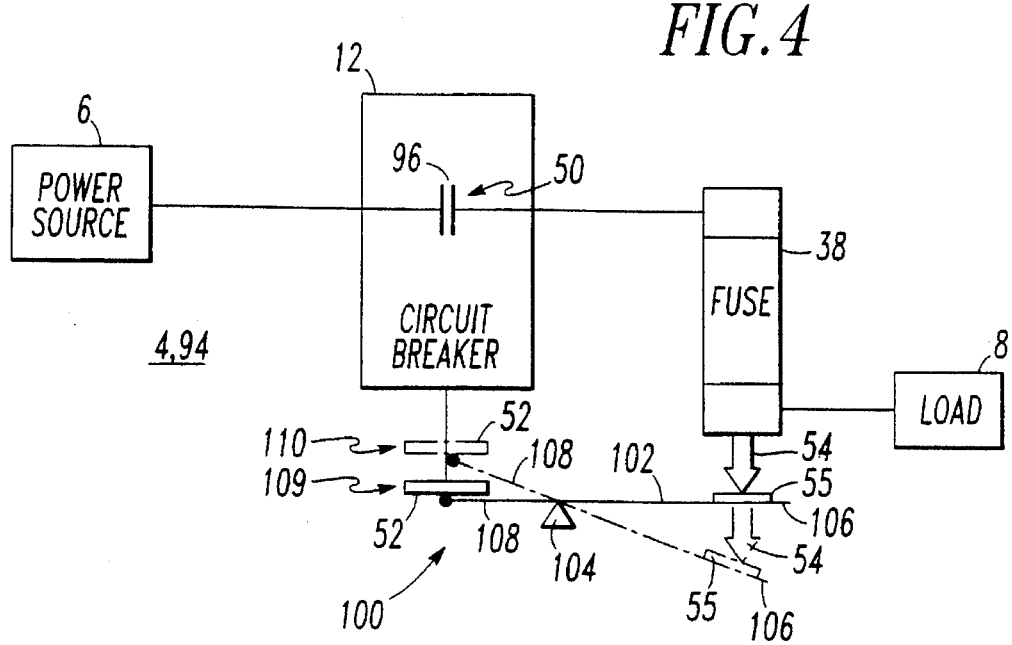
FIG. 4 is a block diagram of an amplifier for amplifying the force of a striker pin in accordance with an embodiment of the present invention.

FIG. 4 illustrates an amplifier 100 for amplifying the striking force of the striker pin 54. The amplifier 100 includes a lever 102 which is pivotally mounted to a pivot point 104. The lever 102 includes an arm 106 which is movable by the striker pin 54 and an arm 108 which moves the trip lever 52. The arm 106 is longer than the arm 108. Therefore, the lever 102 amplifies the striking force of the striker pin 54 and provides the engaging force to the trip lever 52. Normally, the striker pin 54, the lever 102 and the trip lever 52 are in a non-tripped position 109 (e.g., the horizontal position of the lever 102 in FIG. 4). Then, whenever the fuse 38 interrupts the circuit between the power source 6 and the load 8, the striker pin 54 moves the arm 106 and, in turn, the opposing arm 108 moves the trip lever 52 to a tripped position 110 (shown in phantom line).

Figure 5:
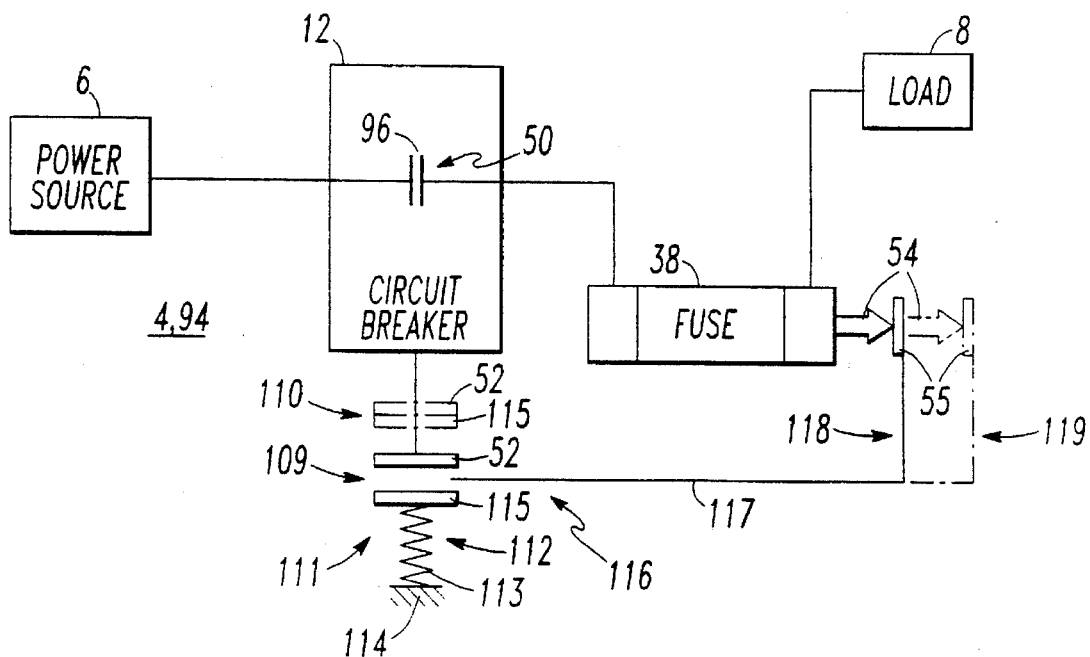
FIG. 5 is a block diagram of an amplifier for amplifying the force of a striker pin in accordance with an alternative embodiment of the present invention.

FIG. 5 illustrates an alternative amplifier 111 for amplifying the striking force of the striker pin 54. The amplifier 111 includes a spring mechanism 112 for driving the trip lever 52 with the engaging force. The spring mechanism 112 includes a spring 113, a fixed surface 114, and a movable surface 115 for engaging the trip lever 52. The amplifier 111 also includes a holding mechanism 116 having an arm 117. The arm 117 holds the movable surface 115 of the spring mechanism 112 whenever the fuse 38 interconnects the circuit between the power source 6 and the load 8. The arm 117 is movable by the striking force of the striker pin 54 from a hold position 118 to a release position 119 (shown in phantom line) whenever the fuse 38 interrupts the circuit between the power source 6 and the load 8. Normally, the striker pin 54, the holding mechanism 116, the spring mechanism 112, and the trip lever 52 are in the non-tripped position 109 where, for example, the spring 113 of the spring mechanism 112 is compressed by the arm 117 of the holding mechanism 116. Then, whenever the fuse 38 interrupts the circuit between the power source 6 and the load 8, the striker pin 54 moves the arm 117 of the holding mechanism 116. In turn, the arm 117 releases the movable surface 115 of the spring mechanism 112 which drives the trip lever 52 to the tripped position 110 (shown in phantom line).

Figure 6:
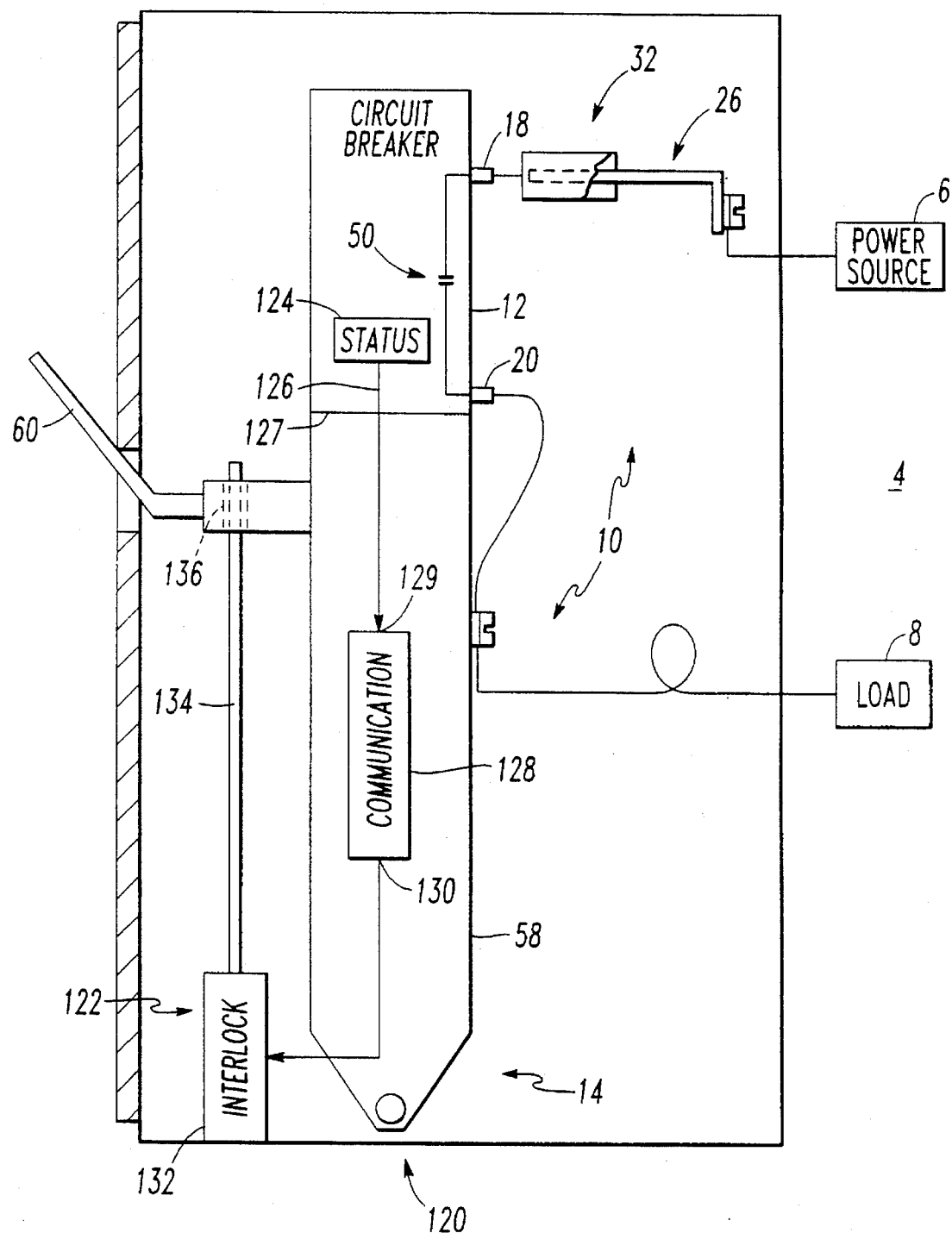
FIG. 6 is a vertical sectional view with some parts cut away and in partial block diagram form of a circuit interruption device including a pivotally mounted arm, a circuit breaker mounted to the arm, and an interlock for blocking movement of the arm.

FIG. 6 illustrates another circuit interruption apparatus 120 including the pivotally mounted arm 58 having the handle 60. The apparatus 120 further includes the circuit breaker 12, which is mounted to the pivot arm 58, and a handle interlock mechanism 122 for blocking movement of the handle 60 and, in turn, the arm 58. In a similar manner as discussed above with FIG. 1, the pivot mechanism 14 pivots the circuit breaker 12 between the connected position 32 where the line terminal 18 is interconnected with the line termination mechanism 26 and the disconnected position 34 (as shown in phantom line in FIG. 1) where the line terminal 18 is preferably disconnected from the line termination mechanism 26. The handle interlock mechanism 122 locks the handle 60 and the circuit breaker 12 in the connected position 32 whenever the circuit 50 between the line terminal 18 and the load terminal 20 is closed.

The circuit breaker 12 further includes a status indication mechanism 124 having an external pin 126 (e.g., a Mechanism Operated Cell (MOC) switch operator) for indicating a closed status when the circuit 50 between the line terminal 18 and the load terminal 20 is closed. An example of a circuit breaker having an external pin is a Type VCP-WR Red Line Series of Fixed Vacuum Breakers marketed by Cutler-Hammer, although any type of circuit interrupter having an external pin or equivalent indicator mechanism for indicating the open status of the circuit 50 may be used. The pin 126 is coupled to a pole shaft (not shown) by a pole shaft lever (not shown). Whenever the circuit breaker 12 is closed, the pin 126 protrudes through a lower surface 127. On the other hand, when the circuit breaker 12 is open, the pin 126 is generally flush with the lower surface 127.

The handle interlock mechanism 122 includes a status communication mechanism 128 (e.g., a mechanical linkage, a flexible shaft, etc.) having an input 129 interconnected with the pin 126 and an output 130. The output 130 communicates the position of the pin 126 and, also, the open or closed status of the circuit breaker 12, to an interlock 132. Whenever the circuit breaker 12 is closed and the pin 126 protrudes through the lower surface 127, the interlock 132 locks the handle 60 and the circuit breaker 12 in the connected position 32. On the other hand, whenever the circuit breaker 12 is open and the pin 126 is generally flush with the lower surface 127, the interlock 132 unlocks the handle 60 and the circuit breaker 12 from the connected position 32. The exemplary interlock 132 includes a pin 134 which engages a hole 136 (shown in shadow) in the handle 60 when the circuit breaker 12 is closed. Otherwise, when the circuit breaker 12 is open, the pin 134 disengages the hole 136 in the handle 60. Then, the handle 60 may freely pivot the pivot mechanism 14 and move the circuit breaker 12 from the connected position 32 to the disconnected position 34 (as shown in phantom line in FIG. 1).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A circuit interruption apparatus for a power circuit having a power source and a load, said circuit interruption apparatus comprising:

termination means for interconnection with said power source and said load;

circuit interrupter means for interrupting said power circuit between said power source and said load, said circuit interrupter means including a line terminal and a load terminal;

pivot means for pivoting said circuit interrupter means between a first position wherein the line terminal and the load terminal are interconnected with said termination means, and a second position wherein one of the line terminal and the load terminal is disconnected from said termination means; wherein a current flows in said power circuit between said power source and said load; wherein said pivot means includes current transformer means for sensing the current; and wherein said circuit interrupter means includes a circuit between the line terminal and the load terminal, and trip unit means for receiving the sensed current from the current transformer means and tripping open the circuit under predetermined conditions of the sensed current; and wherein said pivot means further includes a pivot point and a pivot arm which is pivotally mounted at the pivot point; wherein the current transformer means and the load termination means are both mounted to the pivot arm; wherein the current transformer means has a hole; and wherein the load termination means further includes load cable means for conducting the current through the hole of the current transformer means.

2. A circuit interruption apparatus for a power circuit having a power source and a load, said circuit interruption apparatus comprising;

termination means for interconnection with said power source and said load;

circuit interrupter means for interrupting said power circuit between said power source and said load, said circuit interrupter means including a line terminal and a load terminal; and pivot means for pivoting said circuit interrupter means between a first position wherein the line terminal and the load terminal are interconnected with said termination means, and a second position wherein one of the line terminal and the load terminal is disconnected from said termination means, wherein said termination means includes line termination means for interconnection with said power source; wherein said circuit interrupter means further includes connection means for connecting the line terminal to the line termination means; and wherein said pivot means pivots said circuit interrupter means and said connection means between a connected position where the line terminal is interconnected with the line termination means and a disconnected position where the line terminal is disconnected from the line termination means; wherein said termination means further includes load termination means fur interconnection with said load, the load termination means including fuse means and fuse holder means for holding the fuse means, the fuse means being in series with the load terminal and said load for interrupting said power source and said load; wherein said circuit interrupter means further includes a circuit between the line terminal and the load terminal, and trip lever means for tripping open the circuit between the line terminal and the load terminal; and wherein the fuse means includes striker pin means for engaging the trip lever means and opening the circuit between the line terminal and the load terminal whenever the fuse means interrupts said power circuit between said power source and said load; wherein the striker pin means provides a striking force whenever the fuse means interrupts said power circuit between said power source and said load; wherein the trip lever means has a minimum engaging force for opening the circuit between the line terminal and the load terminal, the minimum engaging force being larger than the striking force; and wherein the fuse means further includes force amplification means for amplifying the striking fume and providing to the trip lever means an engaging force which at least equals the minimum engaging force.

3. A circuit interruption apparatus for a power circuit having a power source and a load, said circuit interruption apparatus comprising:

circuit interrupter means for interrupting said power circuit between said power source and said load, said circuit interrupter means including trip lever means for tripping open said power circuit; and fuse means for interrupting said power circuit between said power source and said load, said fuse means being in series with said circuit interrupter means between said power source and said load and including striker pin means for engaging the trip lever means and tripping open said power circuit whenever said fuse means interrupts said power circuit, wherein the striker pin means provides a striking force whenever said fuse means interrupts said power circuit between said power source and said load; wherein the trip lever means has a minimum engaging force for tripping open said power circuit, the minimum engaging force being larger than the striking force; and wherein said fuse further includes force amplification means for amplifying the striking force and providing to the trip lever means an engaging force which at least equals the minimum engaging force.

4. A circuit interruption apparatus for a power circuit having a power source and a load, said circuit interruption apparatus comprising;

termination means for interconnection with said power source and said load;

circuit interrupter means for interrupting said power circuit between said power source and said load, said circuit interrupter means including a line terminal and the load terminal;

pivot means for pivoting said circuit interrupter means between a first position wherein the line terminal and the load terminal are interconnected with said termination means, and a second position wherein one of the line terminal and the load terminal is disconnected from said termination means, wherein said termination means includes line termination means for interconnection with said power source; wherein said circuit interrupter means further includes connection means for connecting the line terminal to the line termination means; and wherein said pivot means pivots said circuit interrupter means and said connection means between a connected position where the line terminal is interconnected with the line termination means and a disconnected position where the line terminal is disconnected from the line termination means; and wherein said pivot means includes handle means for moving said circuit interrupter means between the connected position and the disconnected position, wherein said circuit interrupter means further includes a circuit between the line terminal and the load terminal; and wherein said pivot means further includes handle interlock means for locking said circuit interrupter means in the connected position whenever the circuit between the line terminal and the load terminal is closed.

5. A circuit interruption apparatus for a power circuit having a power source and a load, said circuit interruption apparatus comprising;

line termination means for interconnection with said power source;

circuit interrupter means for interrupting said power circuit between said power source and said load, said circuit interrupter means including a line terminal and load termination means fur interconnection with said load;

pivot means fur pivoting said circuit interrupter means between a first position wherein the line terminal is interconnected with said line termination means, and a second position wherein the line terminal is disconnected from said line termination means; and wherein said load termination means includes a fuse means and a fuse holder means for holding the fuse means, the fuse means being in series with the load terminal and said load for interrupting said power circuit between said power source and said load, wherein said circuit interrupter means further includes a circuit between the line terminal and the load terminal, and trip lever means for tripping open the circuit between the line terminal and the load terminal; and wherein the fuse means includes striker pin means for engaging the trip lever means and opening the circuit between the line terminal and the load terminal whenever the fuse means interrupts said power circuit between said power source and said load, wherein the striker pin means provides a striking force whenever the fuse means interrupts said power circuit between said power source and said load; wherein the trip lever means has an engaging force for opening the circuit between the line terminal and the load terminal, the engaging force being larger than the striking force; and wherein the fuse means further includes force amplification means for amplifying the striking force and providing the engaging force to the trip lever means.

6. The circuit interruption apparatus as recited in claim 4 wherein said circuit interrupter means further includes status indication means for indicating an open status when the circuit between the line terminal and the load terminal is open; and wherein said handle interlock means includes status communication means for communicating the open status to the handle interlock means in order to unlock said circuit interrupter means from the connected position.

7. The circuit interruption apparatus as recited in claim 5 wherein the force amplification means includes a lever pivotally mounted to a pivot point, the lever having a first arm which is movable by the striker pin means and a second arm which moves the trip lever means, the first arm being longer than the second arm in order to amplify the striking force of the striker pin means and provide the engaging force to the trip lever means.

8. The circuit interruption apparatus as recited in claim 5 wherein the force amplification means includes spring means for driving the trip lever means with the engaging force and holding means for holding the spring means whenever the fuse means interconnects said power circuit between said power source and said load, the holding means being movable by the striking force of the striker pin means from a hold position to a release position whenever the fuse means interrupts said power circuit between said power source and said load.

9. A circuit interruption apparatus for a power circuit having a power source and a load, said circuit interruption apparatus comprising:

termination means for interconnection with said power source and said load;

circuit interrupter means for interrupting said power circuit between said power source and said load, said circuit interrupter means including a line terminal and a load terminal;

pivot means for pivoting said circuit interrupter means between a first position wherein the line terminal are interconnected with said termination means, and a second position wherein one of line terminal and the load terminal is disconnected from said termination means, wherein said termination means includes line termination means with said power source; wherein said circuit interrupter means further includes connection means; and wherein said pivot means pivots said circuit interrupter means and said connection means between a connected position where the line terminal is interconnected with the line termination means and a disconnected position where the line terminal is disconnected from the line termination means; and wherein the connection means includes a plurality of fingers interconnected with the line terminal; wherein the line termination means includes a stab; and wherein the plurality of fingers grasp the stab in the connected position and release the stab in the disconnected position.

10. The circuit interruption apparatus as recited in claim 9 wherein said circuit interrupter means has a proximate side and a distal side; wherein the plurality of fingers are mounted adjacent the distal side of said circuit interrupter means; and wherein said pivot means includes a housing for housing said circuit interrupter means therein, the housing including viewing means for viewing the plurality of fingers and the stab from the proximate side.

11. The circuit interruption apparatus as recited in claim 10 wherein the housing has a window; and wherein the viewing means is a mirror for viewing the plurality of fingers and the stab through the window.

* * * * *